(12) United States Patent
Stark

(10) Patent No.: US 11,379,620 B2
(45) Date of Patent: Jul. 5, 2022

(54) SELECTIVE REPLACEMENT OF INFORMATION WITHIN COMMUNICATION METADATA

(71) Applicant: T-Mobile USA, Inc., Bellevue, WA (US)

(72) Inventor: Jay Stark, Tukwila, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/951,965

(22) Filed: Nov. 18, 2020

(65) Prior Publication Data

US 2021/0157953 A1 May 27, 2021

Related U.S. Application Data

(60) Provisional application No. 62/939,552, filed on Nov. 22, 2019.

(51) Int. Cl.
*H04L 29/06* (2006.01)
*G06F 21/62* (2013.01)
*H04L 9/08* (2006.01)

(52) U.S. Cl.
CPC ...... *G06F 21/6263* (2013.01); *G06F 21/6254* (2013.01); *H04L 9/0869* (2013.01)

(58) Field of Classification Search
CPC ............. G06F 21/6263; G06F 21/6254; G06F 21/6245; H04L 9/0869; H04L 63/0407
See application file for complete search history.

(56) References Cited

U.S. PATENT DOCUMENTS

| 2010/0146583 | A1* | 6/2010 | Prehofer | G06Q 10/10 726/1 |
| 2015/0074392 | A1* | 3/2015 | Boivie | G06F 21/6227 713/164 |
| 2016/0203336 | A1* | 7/2016 | Nambiar | G06F 21/6254 726/26 |
| 2018/0359223 | A1* | 12/2018 | Maier | H04L 63/1441 |
| 2019/0377902 | A1* | 12/2019 | Schroeder | G06N 20/20 |
| 2021/0133557 | A1* | 5/2021 | Iyoob | G06K 9/6267 |

\* cited by examiner

*Primary Examiner* — Yogesh Paliwal
(74) *Attorney, Agent, or Firm* — Han Santos, PLLC

(57) ABSTRACT

Described herein are techniques that provide privacy protection for a user by preventing user device tracking via device fingerprints. A communication may be received from a user device that includes metadata having information related to the user device. An intended recipient of the communication may be identified. Based on one or more of the user device or the recipient, a determination may be made as to what data within the metadata should be scrambled or selectively replaced. The data may then be overwritten with alternative data that may be selected at random, and the communication is forwarded to the recipient.

19 Claims, 5 Drawing Sheets

SELECTIVE REPLACEMENT OF INFORMATION WITHIN COMMUNICATION METADATA

BACKGROUND

Websites often collect information about devices used to access that website in order to provide targeted advertising and/or track users. While some of this information may seem innocuous, it may actually raise serious privacy concerns. For example, a device fingerprint is made up of information that is collected by the website about seemingly innocuous features (e.g., software and hardware installed on) for a particular device. A combination of seemingly innocuous features may be so unique that a particular device can be identified based solely on its device fingerprint. This allows websites to track particular devices even when a user is actively attempting to avoid tracking (e.g., using privacy mode, etc.), which can be problematic.

SUMMARY

Techniques are provided herein for enabling the prevention of tracking of a user via metadata included in his or her communications. In some embodiments, this involves intercepting communications originating from the user and scrambling (i.e., replacing or otherwise obfuscating) data values included within metadata for the communications. To do this, data values within data fields of the metadata may be decrypted and parsed. The appropriate replacement data values are then selected to be overwritten into the data fields. The data values in the data fields may be re-encrypted and the communication is forwarded to its intended recipient. In some embodiments, the data fields overwritten and/or the selected data values are selected based on the identity of the recipient or the user.

In one embodiment, a method is disclosed as being performed by a telecommunication network, the method comprising receiving a communication originating from a user device and directed to a recipient device, determining one or more data fields to be replaced within a metadata for the communication, selecting replacement data values for the one or more data fields to be replaced within the metadata for the communication, overwriting data values within the one or more data fields to be replaced with the selected replacement data values, and forwarding the communication with the overwritten data values to the recipient device.

An embodiment is directed to a computing device comprising: a processor; and a memory including instructions that, when executed with the processor, cause the computing device to, at least: receive a communication originating from a user device and directed to a recipient device, determine one or more data fields to be replaced within a metadata for the communication, select replacement data values for the one or more data fields to be replaced within the metadata for the communication, overwrite data values within the one or more data fields to be replaced with the selected replacement data values, and forward the communication with the overwritten data values to the recipient device.

An embodiment is directed to a non-transitory computer-readable media collectively storing computer-executable instructions that upon execution cause one or more computing nodes to collectively perform acts comprising receiving a communication originating from a user device and directed to a recipient device, determining one or more data fields to be replaced within a metadata for the communication, selecting replacement data values for the one or more data fields to be replaced within the metadata for the communication, overwriting data values within the one or more data fields to be replaced with the selected replacement data values, and forwarding the communication with the overwritten data values to the recipient device.

Embodiments of the disclosure provide several advantages over conventional systems. For example, the system provides for the ability to disallow tracking of a personal user device using a device fingerprint. It should be noted that conventional means of protecting the privacy of a user are typically unable to prevent tracking of a user's activities via a device fingerprint. For example, the user may open a web browser application in "privacy mode," however, doing so would only prevent the use of internet cookies via the user device. While a website operator may be hampered without receiving identifying information from a cookie located on the user device, the website operator would not be prevented from creating a device fingerprint from seemingly innocuous information and tracking the user device using that device fingerprint. The current system prevents tracking of users based on device fingerprint in an unconventional manner.

The foregoing, together with other features and embodiments will become more apparent upon referring to the following specification, claims, and accompanying drawings.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
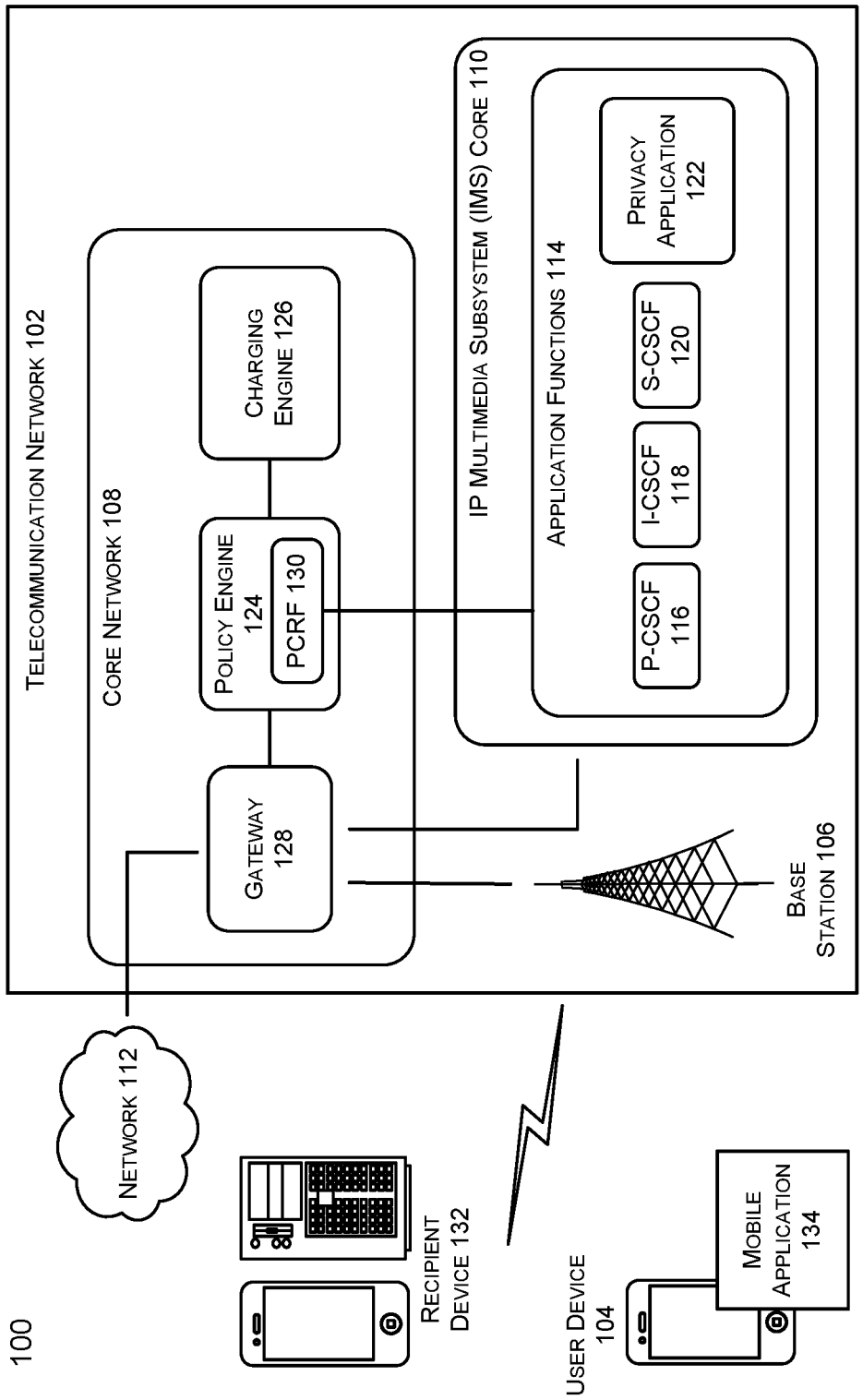
FIG. 1 illustrates an example architecture of a core network in a mobile telecommunication network for implementing privacy protection techniques in accordance with embodiments of the disclosure.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

This disclosure describes techniques that may be used to provide privacy protection by preventing a website from creating an accurate device fingerprint. A device fingerprint may be generated from seemingly innocuous information. For example, a website may collect from a user device that accesses it a type of the user device, an operating system, a screen resolution, a browser and browser version, language, time zone, and/or other suitable data to generate a unique device fingerprint for the user device.

More particularly, the techniques scramble metadata associated with a communication initiated by a user device 104 over a telecommunications network. In some cases, the metadata may include instances of personally identifiable information that the user associated with the user device 104 may wish to be kept private. Specifically, a privileged data system may be configured to reside at the edge of a telecommunication network for the purpose of intercepting voice communication and/or website access requests. In one example, the privileged data system may reside at or before a Proxy Call Session Control Function of an Internet Protocol (IP) Multimedia Subsystem (IMS) core. In one example, the privileged data system may be configured to intercept Session Initiation Protocol (SIP) INVITE messages directed towards the IMS core and in doing so, selectively scramble select instances of metadata that are identified as to be kept private from a recipient device of the communication request (e.g., within a header of the SIP INVITE message).

In another example, a communication request may have been initiated via a Wi-Fi communication protocol, and thus present itself in a form other than a SIP INVITE message. By way of example, a Wi-Fi call may be initiated from within a user application that resides on a user device 104. In this example, the privileged data system may intercept the data communication from the user application and determine whether a Wi-Fi protocol is being used. If so, the privileged data system may further determine whether a Wi-Fi call is being initiated and if so, selectively scramble select instances of metadata that are identified as to be kept private from a recipient device of the Wi-Fi call. A Wi-Fi call may be identified based on the use of the 802.1x protocol, a notification sent by the user application that resides on the user device 104 that a Wi-Fi call is initiated, or a notification sent by network router that is consistent with a Wi-Fi call.

In another example, a user may request access to a network document (e.g., a webpage) maintained by a website host server. In this scenario, the user device 104 may communicate a number of details about the user device 104 to the website host server. These communications between the user device 104 and the website host server may be protected using Transport Layer Security (TLS). In this scenario, the communications may be decrypted, certain instances of metadata may be scrambled within the communication, and the communication may be re-encrypted before being forwarded on to the website host server. In some embodiments, the instances of metadata to be replaced are determined based on the website host server involved.

In any case, once a communication request has been identified, the privileged data system may interrogate data records associated with the user device 104 that identify instances of personally identifiable information that are to be shared with the recipient device and other instances of personally identifiable information that are not to be shared with the recipient device. In doing so, the privileged data system may scramble (e.g., replace) instances of personally identifiable information that is not to be shared. In some instances, and per the data records within the privileged data system, scrambled privileged data may be replaced with alternative (i.e. pseudo) data in its place.

FIG. 1 illustrates an example architecture of a core network in a mobile telecommunication network for implementing privacy protection techniques in accordance with embodiments of the disclosure. The architecture 100 may include a telecommunication network 102 that serves multiple user devices, such as the originating user device 104. The user device 104 may be a feature phone, a smartphone, a tablet computer, a phablet, an embedded computer system, or any other device that is capable of using the wireless communication services that are provided by the mobile telecommunication network 102 to communicate with other electronic devices.

The mobile telecommunication network 102 may include multiple base stations, such as the base station 106, as well as a core network 108. The mobile telecommunication network 102 may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth. The base stations are responsible for handling voice and data traffic between user devices and the core network 108. In some embodiments, the base stations may be in the form of eNodeB nodes. Each eNodeB node may include a base transceiver system (BTS) that communicates via an antenna system over an air-link with one or more user devices that are within range. The antenna system of an eNodeB node may include multiple antennas that are mounted on a radio tower to provide a coverage area that is referred to as a "cell." The BTS may send RF signals to user devices and receive radio signals from user devices.

The core network 108 may provide telecommunication and data communication services to multiple user devices. For example, the core network 108 may connect the user devices to other telecommunication and data communication networks, such as a network 112 (e.g., the Internet) and a public switched telephone network (PSTN). Accordingly, data packet communications via the core network 108 and the Internet may support a variety of services.

In various embodiments, an IP Multimedia Subsystem (IMS) core 110 may reside in the mobile telecommunication network 102. The IMS core 110 may include one or more application functions 114. In various embodiments, the application functions 114 may include a Proxy Call Session Control Function (P-CSCF) 116, Interrogating Call Session Control Function (I-CSCF) 118, Serving Call Session Control Function (S-CSCF) 120 or an equivalent function. In instances in which the application functions 114 include the P-CSCF 116, the P-CSCF 116 may route incoming SIP messages to an IMS registrar server. The P-CSCF 116 may also safeguard the security of the IMS core 110 by handling Internet Protocol Security (IPSec) for communications that are exchanged by the user devices. In some alternative instances, instead of SIP sessions, the P-CSCF may handle Remote Authentication Dial-In User Service (RADIUS) sessions. The P-CSCF may interact with the I-CSCF 118, and S-CSCF 120. The S-CSCF may communicate with a telephony application server (TAS) that resides in the core network 108. The TAS may route voice and/or data communications within the mobile telecommunication network 102 and with other networks, including public switch telephone networks (PSTNs). For example, the TAS may be a SIP application server that handles IP telephony for voice over LTE (VoLTE) services. Collectively, the CSCFs may handle Session Initiation Protocol (SIP) sessions, which are communication sessions for packet-based voice and video calls, instant messaging over IP networks, and/or so forth.

The application functions 114 may further include privacy application 122 configured to intercept communications routed to the IMS core 110 and replace at least a portion of the metadata in those communications. For example, the privacy application 122 may perform the interception and replacement prior to the communication being routed to the P-CSCF 116. In another example, the privacy application 122 may perform the interception and replacement prior to the S-CSCF 120 routing the communication to the TAS or a gateway. The metadata for a communication may include a number of details related to the user and/or the user device 104. For example, the metadata may include information about various software and/or hardware included on the user device 104. In another example, the metadata may include an IP address. In another example, the metadata may include identifying information such as a name, alias, or user device identifier. The privacy application 122 may be configured to replace specified portions within the metadata. In some embodiments, the specified portions of the metadata to be replaced are determined based upon the intended recipient of the communication. For example, the privacy application 122 may maintain a set of potential recipients as well as a mapping of metadata to be replaced for each of those potential recipients. In some embodiments, the privacy application 122 may maintain multiple lists of potential recipients, with each list associated with a set of metadata to be replaced in communications directed toward the respective recipient. In some embodiments, a user may determine instances of privileged data that may be shared with particular recipients. For example, a user may selectively share the first subset of privileged data with a first recipient device and the second subset of privileged data with a second recipient device. The first and second subsets of privileged data may overlap to some extent, but overall, may not be identical.

The core network 108 may further include a policy engine 124, a charging engine 126, and a gateway 128. The policy engine 124 may be a software component that determines policy and enforces policy rules and serves to establish calls and allocate bandwidth to call bearers. In various embodiments, the policy engine 124 may include a Policy and Charging Rules Function (PCRF) 130 or another equivalent core network component of the mobile telecommunication network 102. Accordingly, the policy engine 124 may interface with the application functions 114 to handle incoming and outgoing communications.

The charging engine 126 may enable the mobile telecommunication network 102 to monitor the services, such as data, voice, text, etc., that are used by each subscriber, and charge the subscribers in real-time based on service usage. In various embodiments, the charging engine 126 may be an Online Charging System (OCS) or another equivalent core network component of the mobile telecommunication network 102.

The gateway 128 may include one or more servers and related components that are tasked with providing connectivity between the IMS core 110, and the user devices (e.g., the user device 104 and/or recipient devices 132), by acting as a point of entry and exit for data traffic. In turn, the IMS core 110 may provide the user devices with data access to external packet data networks 112, such as the networks of other wireless telecommunication providers or the Internet. Accordingly, the gateway 128 may perform functions such as policy enforcement, packet filtering, packet screening, and/or charging support. In various embodiments, the gateway 128 may be a Packet Data Network Gateway (PGW) or another equivalent core network component of the mobile telecommunication network 102.

A recipient device 132 is any electronic device that is the intended recipient of a communication request. In a scenario in which the user device 104 is a mobile telephone that is used to make a call, the recipient device 132 may be another mobile telephone device. In a scenario in which the user device 104 is used to request access to a website, the recipient device 132 may be a website host server capable of serving a webpage to the user device 104. In some embodiments, the user device 104 may include in its memory a mobile application 134 that enables at least a portion of the functionality described herein.

A number of interactions may occur between various components of the architecture 100 during a process in which portions of metadata may be replaced. In such a process, a user may provide an indication of privacy settings for one or more recipients of user communications. The telecommunication network 102 may subsequently receive a communication originating from the user. Upon receiving this communication, the telecommunication network 102 may replace various portions of metadata associated with the communication in order to obfuscate an identity of the user. This process is described in greater detail below.

A user may identify data that may or may not be shared with a recipient device 132 over a telecommunication network. In some embodiments, the user may identify the data via a mobile application 134 installed on the user device 104 that enables interaction with the privacy application 122 of the telecommunication network 102. In some embodiments, the data may be comprised of privileged or personally identifiable information associated with the user, such as a name, phone number, address, geolocation and/or so forth. For a selection of recipient devices 132, the user may selectively share a subset of, but not all, portions of metadata. In one non-limiting example, a user may selectively share their name and phone number with a recipient device associated with a financial institution. In this example, the user's name and phone number may be used as a mechanism for the financial institution to verify their identity. At the same time, the user may choose not to share their current and/or historical record of geolocations as logged by their user device 104.

In this way, a mobile application that resides on the user device 104, may capture the data share request associated with the particular recipient, and transmit that data share request to a privacy application 122 in association with the user device 104 or an account for the user. The privacy application 122 may record the data share request within a data record associated with the user.

The user may repeat the above-referenced process of generating data share requests for a plurality of recipient devices, each with differing data share criteria. In each instance of a data share request, the privacy application 122 may generate individual data records that associate the user with each instance of data share request and its corresponding recipient device.

It is noteworthy that the connection between the user device 104 and the telecommunication network 102 is a secure connection. The secure connection may be established via end-to-end encryption. In this example, the user device 104 may be configured to encrypt outgoing communications with a first key of an asymmetric key pair, and one or more components of the telecommunication network 102 may be configured to decrypt the encrypted communication using the counterpart key of the asymmetric key pair.

At a subsequent time, the user device 104 may initiate a request for a communication session with a particular recipient device 132. In some embodiments, the communication session may correspond to a voice communication over an LTE network or a voice communication over a Wi-Fi network. In some embodiments, the communication session may correspond to a request to be served a website maintained by a website host server.

The request for a communication session may be intercepted by the privacy application 122 on an IMS core 110 that resides at or near the edge of the telecommunication network 102. In one example, the communication session request may be intercepted prior to delivery to a Proxy Call Session Call Function (P-CSCF) 116 of the IMS core 110, or alternatively, the Serving Call Session Call Function (S-CSCF) of the IMS Core. In other words, the privacy application 122 may be located at the gateway 128 of the telecommunication network. In one example, the request for a communication session may be received in the form of a SIP INVITE message for a Voice over Internet Protocol (VoIP). In this example, the privileged data system may parse through the SIP INVITE message, to identify the corresponding recipient device. In another example, the request for a communication session is an HTTP request to access a website.

The privacy application 122 may correlate the recipient device identified within the request with data records stored within the telecommunication network 102. In doing so, the privacy application 122 may identify a first subset of data that may be provided to the recipient device and a second subset of privileged data that is to be hidden from the recipient device. Continuing with the previous example of communicating with a financial institution, the privacy application 122 may determine that user is inclined to share their name and phone number with the financial institution, but omit references to other personally identifiable information, such as a geolocation. In this example, the privacy application 122 may selectively scramble all references to the metadata for the communication that the user did not intend to share with the financial institution. In this example, data values within particular data fields to be scrambled are replaced with different data values. For example, a data value in a "hardware component" data field within the metadata may be overwritten with a data value corresponding to a valid data value for the field. By way of illustration, a communication originating from a user device 104 that is an Apple® device may include metadata indicating the type of device. In this illustration, the data value in the hardware component data field may be replaced with a value that indicates the communication originated from an Android® device. In some embodiments, the data value to be written to a data field to be scrambled may be selected in a random or pseudo-random fashion from a list of valid options for the data field.

Once the metadata has been scrambled, the privacy application 122 may transmit the communication having the modified metadata to the same point within the IMS Core 110 from which it was intercepted, that being the P-CSCF 116 or the S-CSCF 120. The communication may then be routed to the appropriate recipient device 132.

Figure 2:
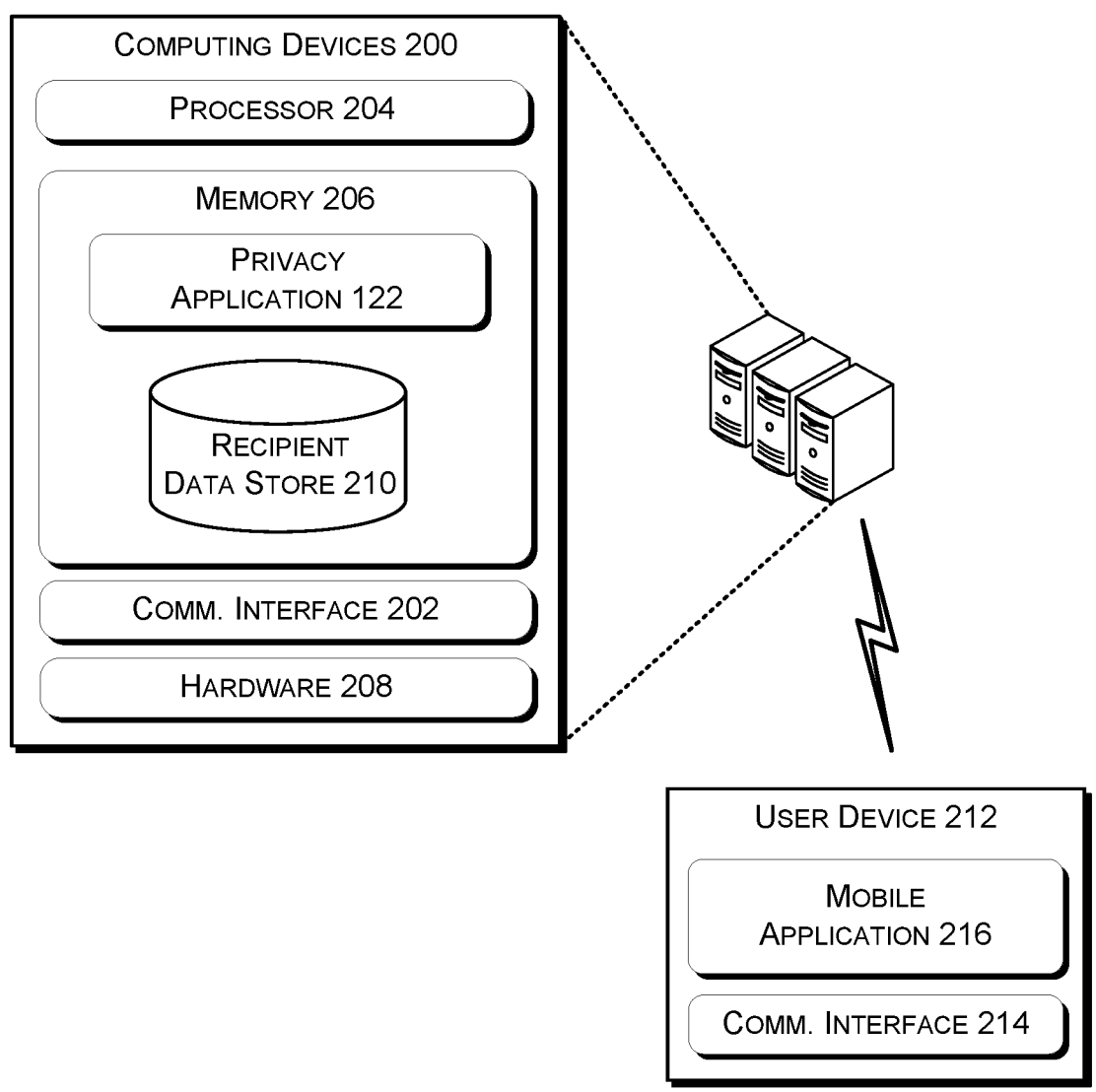
FIG. 2 is a block diagram showing various components of a system architecture that supports a mobile telecommunication network for implementing metadata scrambling.

FIG. 2 is a block diagram showing various components of a system architecture that supports a mobile telecommunication network for implementing metadata scrambling. The system architecture may include one or more computing devices 200. The computing devices 200 may include a communication interface 202, one or more processors 204, memory 206, and hardware 208. The communication interface 202 may include wireless and/or wired communication components that enable the computing devices 200 to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The computing devices 200 can include any computing device configured to perform at least a portion of the operations described herein. Computing devices 200 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Computing devices 200 can include one or more virtual machines running virtual operating systems, or other computing architectures involving virtualization such as one or more flexible pools of logical storage devices that can be virtualized to maintain virtual storage devices for the computer. For example, the computing devices 200 may be a virtual computing devices in the form of virtual machines or software containers that are hosted in a cloud.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 204 and the memory 206 of the computing devices 200 may implement functionality from or one or more software modules and data stores. Such software modules may include routines, program instructions, objects, and/or data structures that are executed by the processors 204 to perform particular tasks or implement particular data types. The one or more software modules may include a privacy application 122 that automatically replaces select data within metadata associated with a communication. The data stores may include a database of recipient data (recipient data store 210) that indicates one or more data values to be replaced within data fields of metadata directed toward particular recipients.

The privacy application 122 may be configured to, upon receiving a communication from the user device 212, identify a number of data fields within a metadata associated with the communication and selectively replace the data values within those data fields. In some embodiments, metadata associated with a communication may be included within a header, footer, or other suitable portion of the communication. In some embodiments, one or more data values within data fields of the metadata may be encrypted when the communication is received. In these embodiments, the privacy application 122 may decrypt the one or more data values. Once the one or more data values have been decrypted, the privacy application 122 may determine which of the data values should be replaced. In some embodiments, this may involve retrieving a set of data fields associated with a recipient device to which the communication was directed (e.g., in recipient data store 210). The privacy application 122 may then determine one or more data values to replace the data values within the data fields to be replaced. This may involve selecting data values from a set of potential valid data value replacements. In some cases, the selection may be made randomly or pseudo-randomly. In some embodiments, a set of specific replacement data values may be selected. For example, data values associated with an alias for a user may be selected. Once the data values in each of the data fields have been replaced with the selected replacement data values, the communication may be routed to the appropriate recipient entity. In some embodiments, the data values in each of the data fields of the metadata may be encrypted prior to the communication being transmitted to the recipient device.

The user device 212 may be any electronic device capable of interacting with the computing devices 200 as described herein. The user device 212 may include a processor and a computer readable memory as well as a communication interface 214. The computer readable memory of the user device 212 may include a mobile application 216 that enables interaction between the user device 212 and the computing devices 200. Execution of the mobile application 216 on the user device 212 may cause the user device 212 to instantiate a graphical user interface (GUI) associated with the mobile applications 216.

The mobile application 216 may enable a user of the user device 212 to interact with the computing devices 200. For example, a communication session may be established between the computing devices 200 and the user device 212 via the respective communication interfaces 202 and 214. In some embodiments, the mobile application 216 may provide a user with access to functionality provided via one or more modules implemented on the copilot management computer 118. In some embodiments, the mobile application 216 may comprise a browser application configured to retrieve and present web pages to a user of the user device 212.

Figure 3:
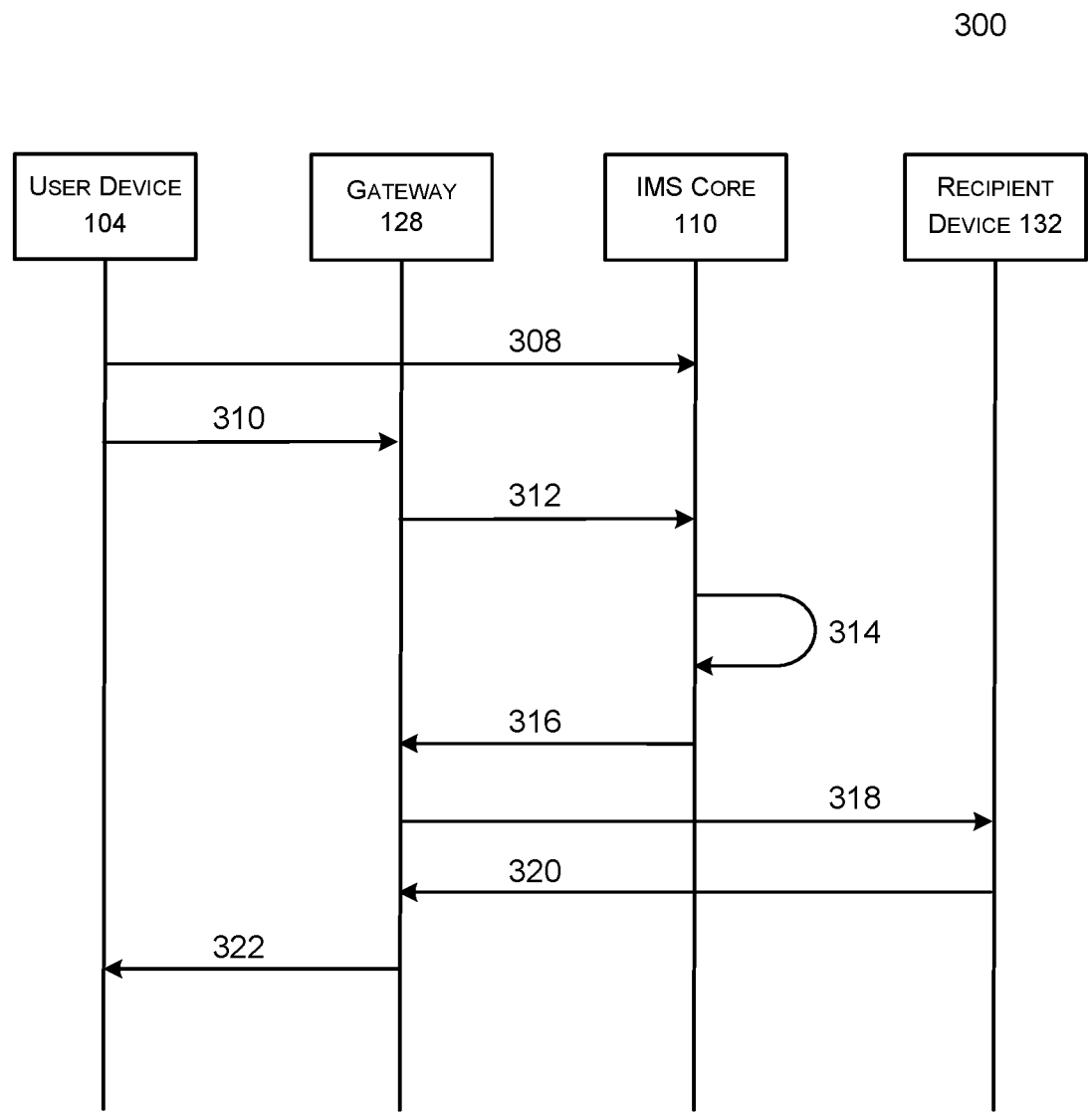
FIG. 3 depicts a block diagram showing an example process flow for selectively replacing data values associated with a communication in accordance with embodiments.

FIG. 3 depicts a block diagram showing an example process flow for selectively replacing data values associated with a communication in accordance with embodiments. The process 300 involves interactions between various components of the architecture 100 described with respect to FIG. 1. More particularly, the process 300 involves interactions between a user device 104, a gateway 128 of a telecommunication network, an IMS core 110 of the telecommunication network, and a recipient device 132 that enables selective replacement of data values within metadata for a communication.

At 308, the process comprises an interaction between the user device 104 and the IMS core 110. In some embodiments, such an interaction may involve a user activating or deactivating a privacy mode such that the user device 104 is made unable to be tracked by a recipient device using a device fingerprint. In at least some of these embodiments the data values within various data fields may be replaced with data values of the appropriate data type. The data values for each replacement data field may be populated with different data values in each successive communication such that the metadata varies with each communication. This prevents tracking of the user device using a device fingerprint.

In some embodiments, an interaction such as that of 308 may involve a user configuring a pseudo-identity with a set of alternative data values to appear in place of specific (e.g., personally identifiable) information within the communication. For example, a user may select a pseudo-identity that is to be presented to a recipient in lieu of actual identifiable information. For example, a publicly recognizable individual, such as a CEO of a large organization, may want to communicate with a select number of individuals of whom the CEO prefers not to share personally identifiable information, such as his or her phone number. In this example, the CEO may configure, via the privileged data application on their user device, a data entry that selectively hides the CEO's phone number and, in its place, presents an alternate phone number.

At 310, a communication is initiated via the user device 104. The communication is received at a gateway 128 of a telecommunication network. In some embodiments, the communication may be transmitted by the user device 104 to the gateway 128 via a long-range communication means (e.g., via a 4G modem). Metadata may be appended to the communication that includes information associated with the user device 104. Upon the communication being received at the gateway 128, the telecommunication network may determine a recipient device 132 of the communication. The telecommunication network may then determine whether data values within the metadata should be replaced based at least in part upon the intended recipient device 132.

At 312, upon determining that the metadata should be replaced within the communication, the telecommunication network routes the communication to a privacy application within the IMS core 110 (e.g., privacy application 122).

At 314, the privacy application of the IMS core 110 determines what data values within the metadata are to be replaced as well as which data values should replace the data values to be replaced. In some embodiments, the data values are replaced with data values selected from a list of potential data values which are formatted in accordance with a data type associated with the data value. For example, if metadata for a communication includes a phone number data field having a data value to be replaced, a data value having a phone number format may be selected from a list of data values formatted as phone numbers that is maintained by the IMS core 110 or such a data value may be generated at random in a phone number format. In some embodiments, the phone number data value selected from a list of phone numbers may be selected from the list at random. In this example, the current data value in the phone number data field of the metadata is overwritten with the selected data value having the phone number format. In some embodiments, a replacement data value may be selected to replace a data value within a data field of the metadata based on its association with a pseudo-identity associated with the user.

At 316, once the data values of the data fields have been replaced within the metadata, the communication is forwarded to the gateway 128 of the telecommunication network. At 318, the gateway 128 may forward the communication to the recipient device 132 for which it was intended.

At 320, the recipient device 132 may respond to the communication. In some embodiments, this comprises providing a response to the communication back to the gateway 128. The response is then forwarded to the user device 104 at 322. In some embodiments, the communication is a request for a website to be served to the user device 104 and the response may include a network document for the website. In some embodiments, the communication is a request to establish communication between the user device 104 and the recipient device 132 and the response is the establishment of a communication session.

In one example, the process 300 describes a process whereby a user initiates a voice communication over Wi-Fi. The voice communication over Wi-Fi may be initiated by the user within a user application installed upon the user device 104. In this example, the telecommunication network may intercept a data communication at a gateway 128 of the telecommunication network and determine whether the data communication is a Wi-Fi communication. The telecommunication network may identify a Wi-Fi communication based on the use of the 801.2x protocol, an indication that the communication was sent from a network router associated with the HPLMN that enables Wi-Fi communication transmissions, or a notification from a user application that resides on the user device 104 that indicates the voice communication is being initiated over a Wi-Fi communication protocol.

In response to determining that the data communication corresponds to a Wi-Fi call, the telecommunication network may identify a recipient device 132 associated with the Wi-Fi call, and interrogate data records that identify which instances of personally identifiable information associated with the user device 104 may be shared with the recipient device and which instances of personally identifiable information is to be hidden.

In doing so, the telecommunication network may route the communication to a privacy application instantiated upon the IMS code 110, which may scramble the subset of information that is to be hidden from the recipient device and transmit the data communication (with the scrambled subset of information) through the telecommunication network through to the recipient device 132.

In some examples the privacy application may replace information that is to be hidden from the recipient device with pseudo information. For example, rather than providing a high-fidelity geolocation of the user device 104, the privacy application may instead provide a geolocation with relatively lower fidelity. For example, rather than an exact address or geographic coordinates to the user device 104, the privacy application may indicate a country within which the user device 104 initiated the call. Other examples of data that may be replaced with pseudo identifiable information include a name or phone number associated with the user device 104.

Figure 4:
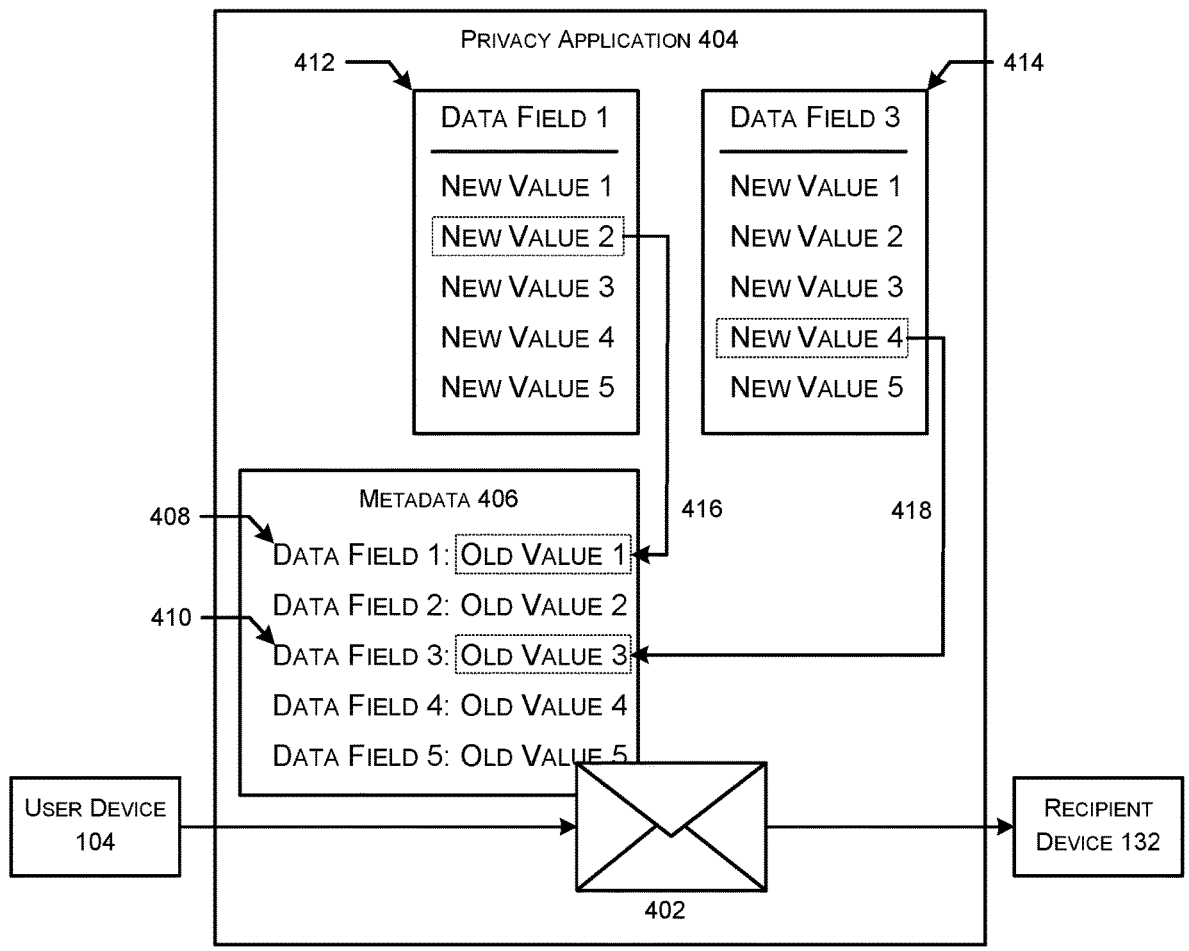
FIG. 4 depicts a block diagram showing an example process flow for selecting and replacing data values within metadata data fields for a communication in accordance with embodiments.

FIG. 4 depicts a block diagram showing an example process flow for selecting and replacing data values within metadata data fields for a communication in accordance with embodiments. In embodiments, a communication 402 originating from a user device 104 and directed to a recipient device 132 is received by a privacy application 404 instantiated on a telecommunication network. The privacy application 404 may determine an identity of the user device 104 and/or of the recipient device 132.

In some embodiments, data values within a metadata 406 for the communication 402 may be identified. For example, the metadata 406 may be parsed in order to determine one or more data fields as well as data values included in particular data fields of the metadata 406. In some embodiments, the data values may be encrypted when they are initially received in the metadata 406 and may be decrypted prior to being determined. The communication may include an indication of the receiving device 132.

Metadata may be appended to a communication in any suitable manner. In some embodiments, metadata may comprise parameter values included in a website access request. In some embodiments, metadata may include information provided by a cookie or other locally-executed applications on the client device 104 along with the communication.

In some embodiments, the privacy application may determine particular data fields 408 and 410 to be replaced. This determination may be made based on either the recipient device 132 or the user device 104. For example, in some embodiments, all communications to a particular recipient device or set of recipient devices (e.g., a blacklist) will have a specified set of data fields scrambled by default. Alternatively, all communications directed to a recipient that is not included in a list of recipients (e.g., a whitelist) will have a specified set of data fields scrambled by default. In some embodiments, the privacy application 404 may determine what data fields are to be scrambled or left unscrambled based on a type or category associated with the recipient device. For example, upon determining that the recipient device 132 is a computing device operated by a financial institution, the privacy application may determine that data fields that pertain to a financial account are to remain unscrambled.

In some embodiments, the privacy application 404 determines an identity of a user or user device 104 from which the communication originated. In some cases, a user may be required to log into an account associated with the user and maintained by an operator of the privacy application 404 using a login and password. In some embodiments, the privacy application 404 may be instantiated within a telecommunication network. In these embodiments, a user and/or user device 104 may be identified using an identifier associated with the communication (e.g., a phone number, IMEI number, or device serial number). Upon identifying the user and/or user device, the privacy application 404 may determine particular data fields to be scrambled based on privacy settings or preferences stored in association with the user. In some embodiments, privacy settings or preferences stored in association with a user may supersede settings stored in association with a recipient device. For example, if the user indicates a desire to share certain data values with the recipient device, those data values may not be scrambled within the metadata even if the default would be to do so.

In some embodiments, scrambling a data value within a data field (e.g., data field 408 or 410) may involve generating or retrieving a different data value and overwriting a current data value in the data field with that different data value. When generating a different value, the data value may be generated in a format associated with the data field. In some embodiments, an appropriate data format may be determined based on a format of a current value identified within the data field. In some cases, the different data value may be generated randomly.

In some embodiments, a different data value may be retrieved by the privacy application 404 to be overwritten into a data field 408 or 410. In at least some of these embodiments, separate lists of potentially-valid data values may be maintained in relation to each data field. For example, a list 412 of new values may be maintained in relation to data field 408 whereas a separate list 414 of new values may be maintained in relation to data field 410. In this example, upon determining that the data values in data fields 408 and 410 are to be scrambled, the privacy application 404 may scramble the data values in each of the respective data files. To do this, the privacy application may first select a first data value from a list 412 of potential data values associated with the data field 408, which is then used to overwrite a data value currently in the data field 408 at 416. The privacy application may then select a second data value from a list 412 of potential data values associated with the data field 408, which is then used to overwrite a data value currently in the data field 408 at 418. In at least some of these embodiments, the data values may be selected from each list 412 and 414 at random. In some embodiments, an index is maintained for each list, such that data values are selected from the list in the order in which they appear and the index is used to track the next data value to be selected.

Once the data fields of the metadata 406 have been scrambled (e.g., overwritten with new data values), the privacy application 404 may route the communication 402 having the replaced data values to the recipient device 132.

Figure 5:
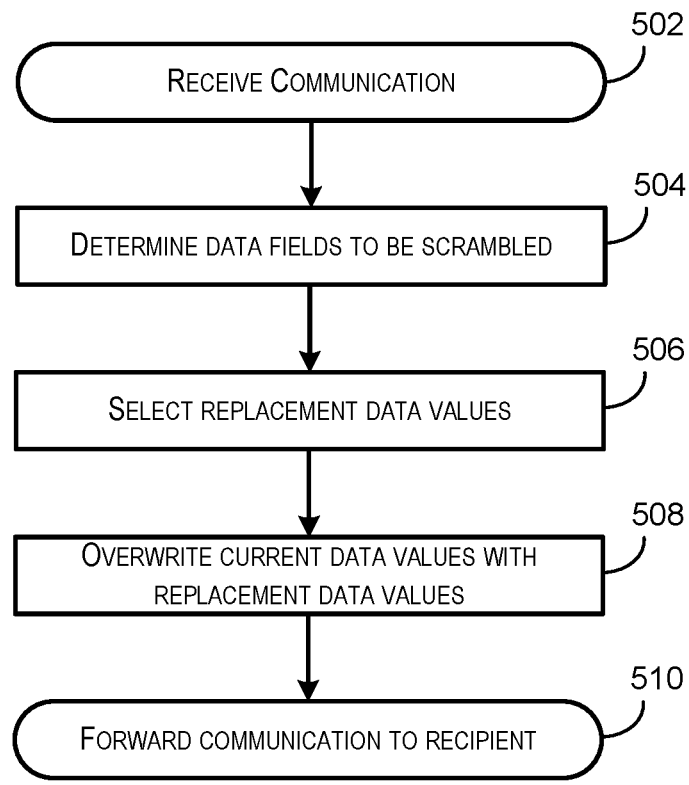
FIG. 5 depicts a flow diagram showing an example process flow for selecting and replacing data values associated with a communication in accordance with embodiments.

FIG. 5 depicts a flow diagram showing an example process flow for selecting and replacing data values associated with a communication in accordance with embodiments. The process 500 may be performed by a computing device that is configured to route communications between electronic devices. For example, the process 500 may be performed by a computing device within a telecommunication network. At least a portion of the process described may be performed by a privacy application instantiated on the computing device as described elsewhere.

At 502, the process 500 comprises receiving a communication from a user device. A user or account may be determined to be associated with the communication by virtue of being associated with the user device. In some embodiments, the process comprises decrypting current data values within a metadata for the communication.

At 504, the process 500 comprises determining data fields to be scrambled or replaced within metadata for the communication. In some embodiments, the one or more data fields to be replaced within the metadata are determined based at least in part on at least one of the user device or the recipient device. For example, the user device may be associated with an account and the one or more data fields to be replaced are determined based on privacy settings stored in association with the account. In some embodiments, the one or more data fields to be replaced are determined based on the recipient device being included on a whitelist or blacklist. In some embodiments, the one or more data fields relate to one or more of a type of the user device, an operating system, a screen resolution, a browser application and browser version, a language, or a time zone. In some embodiments, the one or more data fields relate to personally identifiable information.

At 506, the process 500 comprises selecting replacement data values to be overwritten to the metadata. In some embodiments, selecting replacement data values for the one or more data fields to be replaced comprises selecting the replacement data values from a list of potential data values of a type associated with the one or more data fields. For example, each of the replacement data values for the one or more data fields are selected from a list of data values stored in association with the corresponding data field. In this example, each list of data values stored in association with a data field includes an index value, the replacement data value being selected from each list of data values based on the corresponding index value. In some embodiments, selecting replacement data values for the one or more data fields to be replaced comprises randomly generating the replacement data values in a format associated with the one or more data fields. In some embodiments, selecting replacement data values for the one or more data fields to be replaced comprises selecting a set of corresponding replacement data values associated with a pseudo identity. In some embodiments, determining one or more data fields to be replaced within the metadata comprises determining at least one data field not to be replaced, the one or more data fields comprising a subset of available data fields less the at least one data field.

At 508, the process 500 comprises overwriting current data values with the selected replacement data values. In some embodiments, the process comprises re-encrypting the overwritten data values prior to forwarding the communication to the recipient device.

At 510, the process 500 comprises forwarding the communication to an intended recipient. In some embodiments, forwarding the communication with the overwritten data values to the recipient device causes a communication session to be established between the user device and the recipient device.

In some embodiments, the process 500 may further comprise receiving a second communication originating from the user device and directed to the recipient device, selecting new replacement data values for the one or more data fields, overwriting data values within the one or more data fields with the new replacement data values, and forwarding the second communication with the new replacement data values to the recipient device. In these embodiments, the new replacement data values may be different from the replacement data values.

Additionally, in some embodiments, the system enables a user to present him/herself to a recipient device using a pseudo-identity that enables the user to maintain a consistent identity while also maintaining his or her privacy.

The embodiments described herein may be implemented on executable software that runs on one or more computing devices. The one or more computing devices may be equipped with a communication interface, a user interface, one or more processors, and memory.

The communication interface may include wireless and/or wired communication components that enable the computing devices to transmit or receive data via a network, such as the Internet. The user interface may enable a user to provide inputs and receive outputs from the one or more computing devices.

The user interface may include a data output device (e.g. visual display or audio speakers), and one or more data input devices. The data input devices may include but are not limited to, combinations of one or more keypads, keyboards, mouse devices, touch screens, microphones, speech recognition packages, and any other suitable devices or other electronic/software selection methods.

Each of the processors may be a single-core processor or a multi-core processor. Memory may be implemented using computer-readable media, such as computer storage media. Computer-readable media includes, at least, two types of computer-readable media, namely computer storage media and communication media. Computer storage media includes volatile and non-volatile, removable and non-removable media implemented in any method or technology for storage of information such as computer-readable instructions, data structures, program modules, or other data. Computer storage media includes, but is not limited to RAM, ROM, EEPROM, flash memory or other memory technology, CD-ROM, digital versatile disks (DVD), Blu-Ray, or other optical storage, magnetic cassettes, magnetic tape, magnetic disk storage or other magnetic storage devices, or any other non-transmission medium that may be used to store information for access by a computing device. In contrast, communication media may embody computer-

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed is:

1. A method comprising:
    receiving, at a telecommunication network, a communication originating from a user device and directed to a recipient device;
    determining, by the telecommunication network, one or more data fields to be replaced within a metadata for the communication;
    decrypting current data values within the one or more data fields to be replaced within the metadata for the communication;
    selecting, by the telecommunication network, replacement data values for the one or more data fields to be replaced within the metadata for the communication;
    overwriting, by the telecommunication network, the decrypted current data values within the one or more data fields with the selected replacement data values;
    re-encrypting the overwritten data values within the one or more data fields; and
    forwarding, by the telecommunication network, the communication with the encrypted overwritten data values to the recipient device.

2. The method of claim 1, wherein selecting replacement data values for the one or more data fields to be replaced comprises selecting the replacement data values from a list of potential data values of a type associated with the one or more data fields.

3. The method of claim 1, wherein selecting replacement data values for the one or more data fields to be replaced comprises randomly generating the replacement data values in a format associated with the one or more data fields.

4. The method of claim 1, wherein selecting replacement data values for the one or more data fields to be replaced comprises selecting a set of corresponding replacement data values associated with a pseudo identity.

5. The method of claim 1, wherein the one or more data fields to be replaced within the metadata are determined based at least in part on at least one of the user device or the recipient device.

6. The method of claim 5, wherein the user device is associated with an account and the one or more data fields to be replaced are determined based on privacy settings stored in association with the account.

7. The method of claim 5, wherein the one or more data fields to be replaced are determined based on the recipient device being included on a whitelist or blacklist.

8. A computing device comprising:
    a processor; and
    a memory including instructions that, when executed with the processor, cause the computing device to, at least:
    receive a communication originating from a user device and directed to a recipient device;
    determine one or more data fields to be replaced within a metadata for the communication;
    decrypt current data values within the one or more data fields to be replaced within the metadata for the communication;
    select replacement data values for the one or more data fields to be replaced within the metadata for the communication;
    overwrite the decrypted current data values within the one or more data fields with the selected replacement data values;
    re-encrypt the overwritten data values within the one or more data fields; and
    forward the communication with the overwritten data values to the recipient device.

9. The computing device of claim 8, wherein the computing device is a computing device of a telecommunication network.

10. The computing device of claim 8, wherein the instructions comprise a privacy application.

11. The computing device of claim 8, wherein each of the replacement data values for the one or more data fields are selected from a list of data values stored in association with the corresponding data field.

12. The computing device of claim 11, wherein each list of data values stored in association with a data field includes an index value, the replacement data value being selected from each list of data values based on the corresponding index value.

13. The computing device of claim 8, wherein the instructions further cause the computing device to:
    receive a second communication originating from the user device and directed to the recipient device;
    select new replacement data values for the one or more data fields;
    overwrite data values within the one or more data fields with the new replacement data values; and
    forward the second communication with the new replacement data values to the recipient device.

14. The computing device of claim 13, wherein the new replacement data values are different from the replacement data values.

15. The computing device of claim 8, wherein the one or more data fields relate to personally identifiable information.

16. The computing device of claim 8, wherein the one or more data fields relate to one or more of a type of the user device, an operating system, a screen resolution, a browser application and browser version, a language, or a time zone.

17. A non-transitory computer-readable media collectively storing computer-executable instructions that upon execution cause one or more computing devices to collectively perform acts comprising:
    receiving a communication originating from a user device and directed to a recipient device;
    determining one or more data fields to be replaced within a metadata for the communication;
    decrypting current data values within the one or more data fields to be replaced within the metadata for the communication;
    selecting replacement data values for the one or more data fields to be replaced within the metadata for the communication;
    overwriting the decrypted current data values within the one or more data fields with the selected replacement data values;
    re-encrypting the overwritten data values within the one or more data fields; and forwarding the communication with the overwritten data values to the recipient device.

18. The system of claim 17, wherein forwarding the communication with the overwritten data values to the recipient device causes a communication session to be established between the user device and the recipient device.

19. The system of claim 17, wherein determining one or more data fields to be replaced within the metadata comprises determining at least one data field not to be replaced, the one or more data fields comprising a subset of available data fields less the at least one data field.

\* \* \* \* \*